(12) United States Patent
Cho et al.

(10) Patent No.: US 8,883,359 B2
(45) Date of Patent: Nov. 11, 2014

(54) FUEL CELL SYSTEM AND DRIVING METHOD OF THE SAME

(75) Inventors: Woong-Ho Cho, Yongin-si (KR); Ming-Zi Hong, Yongin-si (KR); Dong-Hyun Kim, Yongin-si (KR); Dong-Rak Kim, Yongin-si (KR); Hyun Kim, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 671 days.

(21) Appl. No.: 12/939,022

(22) Filed: Nov. 3, 2010

(65) Prior Publication Data

US 2012/0003553 A1 Jan. 5, 2012

(30) Foreign Application Priority Data

Jun. 30, 2010 (KR) .......................... 10-2010-0062873

(51) Int. Cl.
*H01M 8/06* (2006.01)
*H01M 8/10* (2006.01)

(52) U.S. Cl.
CPC .... *H01M 8/0631* (2013.01); *H01M 2008/1095* (2013.01); *Y02E 60/50* (2013.01)
USPC .......................................... 429/423; 429/427

(58) Field of Classification Search
CPC ..................... H01M 2008/1095; H01M 8/0631
USPC .................................................. 429/423, 427
See application file for complete search history.

(56) References Cited

U.S. PATENT DOCUMENTS

| 6,093,500 | A * | 7/2000 | Margiott et al. | ............... 429/429 |
| 6,242,119 | B1 * | 6/2001 | Komura et al. | ............... 429/424 |
| 2004/0131540 | A1 * | 7/2004 | Fujii et al. | ..................... 423/650 |

FOREIGN PATENT DOCUMENTS

| JP | 2005-302542 A | 10/2005 |
| JP | 2008-159464 | 7/2008 |
| JP | 2009-016077 A | 1/2009 |
| KR | 10-1997-0025971 | 6/1997 |
| KR | 10-0546517 B1 | 1/2006 |
| KR | 10-2009-0100736 A | 9/2009 |

OTHER PUBLICATIONS

KIPO Notice of Allowance (Korean only) issued Apr. 16, 2012 for the corresponding Korean priority application No. 10-2010-0062873.

* cited by examiner

*Primary Examiner* — Helen O Conley
(74) *Attorney, Agent, or Firm* — Knobbe, Martens, Olson & Bear LLP

(57) ABSTRACT

A method of driving a fuel cell system is disclosed. The method of driving the fuel cell system may include supplying water to a reformer by pressing a pump pipe to pressing members to move the pressing members in a first direction, stopping power generation including stopping a supply of fuel and oxidant to the reformer, and discharging water in the reformer by moving the pressing members in a second direction opposite to the first direction while pressing the pump pipe with the pressing members. A fuel cell system is also disclosed. The fuel cell system includes a reformer, a fuel cell stack and a water transferring pump. The water transferring pump includes pressing members and a pump pipe. The pump pipe is in fluid communication with a water transferring pipe.

10 Claims, 3 Drawing Sheets

FUEL CELL SYSTEM AND DRIVING METHOD OF THE SAME

CROSS-REFERENCE TO RELATED APPLICATIONS

This application claims priority to and the benefit of Korean Patent Application No. 10-2010-0062873 filed in the Korean Intellectual Property Office on Jun. 30, 2010, the entire contents of which are incorporated herein by reference.

BACKGROUND

1. Field of the Disclosure

The present disclosure relates to a driving method of a fuel cell system including discharging moisture in a reformer.

2. Description of the Related Technology

A fuel cell is a device that electrochemically generates power using fuel (hydrogen or reforming gas) and oxidant (oxygen or air). That is, the fuel cell directly converts the fuel and oxidant into electrical energy by an electrochemical reaction. Fuel containing a large amount of hydrogen generated by reforming hydrocarbon-based fuel (LNG, LPG, $CH_3OH$) or pure hydrogen is used as the fuel of the fuel cell. Air containing a large amount of oxygen or pure oxygen is used as the oxidant of the fuel cell.

Types of fuel cells include polymer electrolyte membrane fuel cells (PEMFC), direct oxidation fuel cells, and direct methanol fuel cells (DMFC). The PEMFC includes a fuel cell main body called as a stack and generates electrical energy by using the electrochemical reaction of hydrogen gas supplied from the reformer and air supplied by the operation of an air pump or a fan. The reformer serves as a fuel processing device that reforms fuel to generate hydrogen-rich reforming gas from fuel and supplies the reforming gas to the stack. To reform fuel, the fuel, together with air and water are supplied to the reformer. Water is supplied for the vapor reforming reaction of the fuel. If water used in the reforming reaction remains in the reformer, however, the water may freeze in the low-temperature environment. When water freezes, water expands and the reformer may be damaged. Further, ice blocks the passage of water and the reformer cannot be driven.

SUMMARY OF CERTAIN INVENTIVE ASPECTS

In one aspect, a method of driving a fuel cell system is provided, which has advantages including easily discharging water in a reformer.

In another aspect, a method of driving a fuel cell system is provided, which has the advantage of discharging water in the reformer and thus preventing water from freezing in the reformer.

In another aspect, a method of driving a fuel cell system to discharge water in the reformer includes, for example, supplying water to a reformer by pressing a pump pipe to pressing members to move the pressing members in a first direction, stopping power generation including stopping a supply of fuel and oxidant to the reformer and discharging water in the reformer by moving the pressing members in a second direction opposite to the first direction while pressing the pump pipe with the pressing members.

In some embodiments, the fuel cell system includes a reformer configured to supply reforming gas to a fuel cell stack. In some embodiments, the fuel cell system includes a water transferring pump including pressing members and a pump pipe having elasticity and in fluid communication with a water transferring pipe configured to supply water to the reformer. In some embodiments, the water transferring pump includes, for example, a rotating body. In some embodiments, the pressing members are fixedly installed to the rotating body. In some embodiments, the pump pipe is installed to contact the pressing members and has elasticity to be contracted by the pressing members. In some embodiments, supplying water to the reformer includes moving the pressing members while pressing the pump pipe in a rotatable direction of the rotating body. In some embodiments, supplying water to the reformer includes rotating the rotating body in a forward direction. In some embodiments, discharging water in the reformer includes rotating the rotating body in a reverse direction opposite to the forward direction. In some embodiments, supplying water to the reformer includes providing rolling-contact from the pressing members to the pump pipe.

In some embodiments, stopping power generation includes, for example, blocking an electrical connection between the fuel cell stack and a load electrically connected to the fuel cell stack and stopping a supply of fuel and oxidant to the fuel cell stack. In some embodiments, stopping the supply of fuel and oxidant to the reformer includes, for example, stopping the supply of fuel, consuming the fuel remaining in the reformer and stopping the supply of oxidant. In some embodiments, discharging water in the reformer includes, for example, pressing the pump pipe using the pressing members, storing water between the pressing members and moving the pressing members while pressing the pump pipe. In some embodiments, moving the pressing members includes rollingly-contacting the pressing members to the pump pipe. In some embodiments, moving the pressing members includes moving the water remaining in the reformer to a water tank in fluid communication with the fuel cell stack. In some embodiments, the water tank is configured to store water generated from the fuel cell stack. In some embodiments, the pressing members are rotatably installed to the rotating body. In some embodiments, the pressing members are formed in a cylindrical shape. In some embodiments, the pressing members are formed in a spherical shape.

In another aspect, a fuel cell system includes, for example, a fuel cell stack, a reformer configured to supply reforming gas to the fuel cell stack and a water transferring pump including pressing members, a pump pipe having elasticity and a rotating body.

In some embodiments, the pump pipe is in fluid communication with a water transferring pipe. In some embodiments, the water transferring pipe is configured to supply water to the reformer. In some embodiments, the pressing members are fixedly installed to the rotating body. In some embodiments, the pump pipe is installed to contact the pressing members and has elasticity to be contracted by the pressing members. In some embodiments, the pressing members are rotatably installed to the rotating body. In some embodiments, the pressing members are formed in a cylindrical shape. In some embodiments, the pressing members are formed in a spherical shape.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive Embodiments" one will understand how illustrated features serve to explain certain principles of the present disclosure.

DETAILED DESCRIPTION OF CERTAIN INVENTIVE EMBODIMENTS

Figure 1:
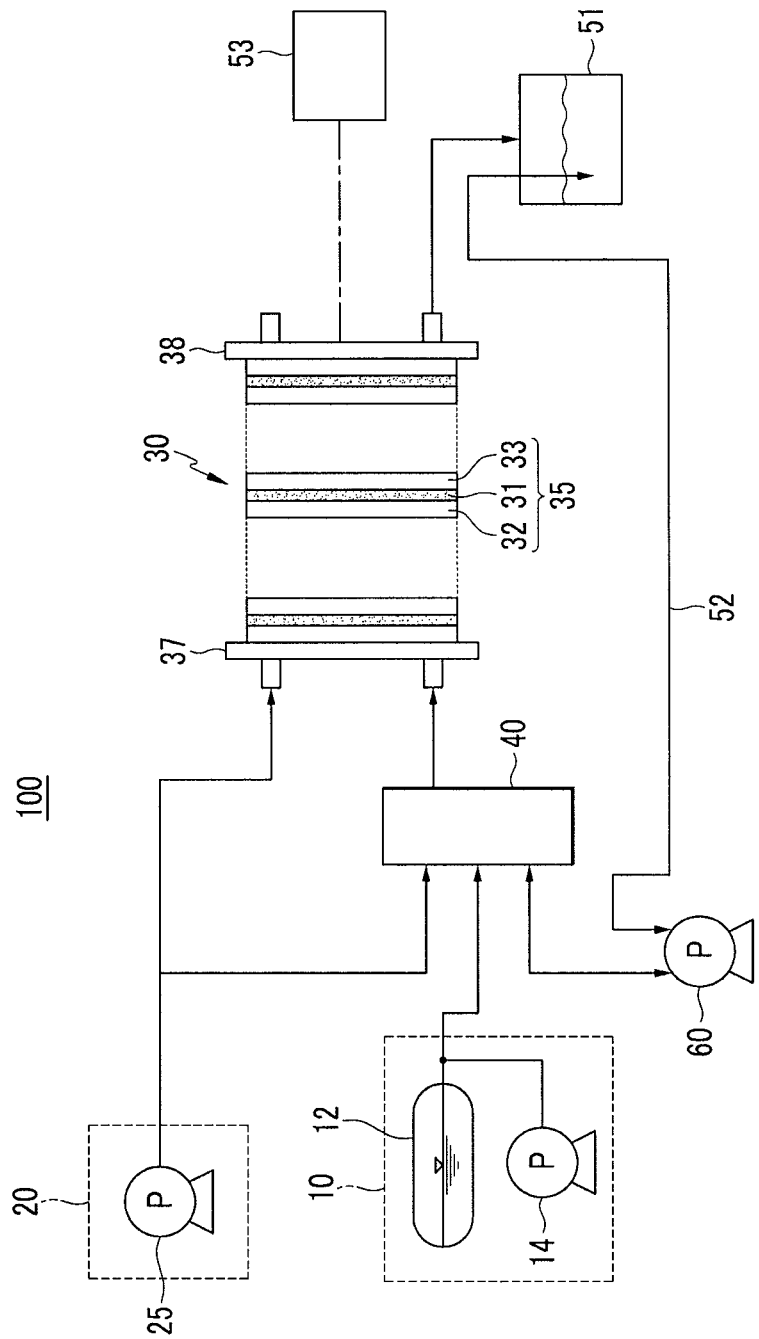
FIG. 1 is a configuration diagram schematically showing a fuel cell system according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Similarly, when it is described that an element is "coupled" to another element, the another element may be "directly coupled" to the other element or "electrically coupled" to the other element through a third element. Parts not related to the description are omitted for clarity. Hereinafter, like reference numerals refer to like elements. Certain embodiments will be described in more detail with reference to the accompanying drawings, so that a person having ordinary skill in the art can readily make and use aspects of the present disclosure.

FIG. 1 is a configuration diagram schematically showing a fuel cell system according to an exemplary embodiment. Referring to FIG. 1, a fuel cell system 100 may include, for example, a polymer electrode membrane fuel cell (PEMFC) configured to reform fuel into hydrogen-rich reforming gas and use it to generate electricity. Fuel used for the fuel cell system 100 is generally hydrocarbon-based fuel in a liquid or gas state such as methanol, ethanol or natural gas, LPG, or the like. Oxidant used in the fuel cell system 100 to react with hydrogen may include oxygen gas stored in a separate storage unit or may be air.

The fuel cell system 100 includes a fuel cell stack 30 configured to generate electrical power by using fuel and oxidant, a fuel supplying unit 10 configured to supply fuel to the fuel cell stack 30, an oxidant supplying unit 20 configured to supply oxidant for generating electricity to the fuel cell stack 30, and a reformer 40 configured to reform fuel and supplies it to the fuel cell stack.

The fuel supplying unit 10 is installed in fluid communication with the reformer 40. The fuel supplying unit 10 includes a fuel tank 12 configured to store fuel in a liquid state and a fuel pump 14 installed in fluid communication with the fuel tank 12. The fuel pump 14 serves to discharge fuel in a liquid state, which is stored in the fuel tank 12 using a predetermined pumping force.

The oxidant supplying unit 20 is installed in fluid communication with the fuel cell stack 30. The oxidant supplying unit 20 includes an oxidant pump 25 uses a predetermined pumping force to supply outside air to the fuel cell stack 30.

The fuel cell stack 30 in the fuel cell system 100 includes a plurality of electric generators 35 configured to induce an oxidation/reduction reaction of fuel and oxidant and thereby generate electrical energy.

Each electric generator 35 includes a unit cell configured to generate electric energy. The unit cell may include a membrane-electrode assembly (MEA) 31 configured to oxidize/reduce oxygen of fuel and oxidant and separators 32 and 33 (also called bipolar plates) configured to supply fuel and oxidant to the membrane-electrode assembly.

The electric generator 35 has a structure where the separators 32 and 33 are respectively disposed at either side of the membrane-electrode assembly 31. The membrane-electrode assembly 31 includes an electrolyte membrane disposed at the center thereof, a cathode electrode disposed at one side of the electrolyte membrane, and an anode electrode disposed at the other side of the electrolyte membrane.

The separators 32 and 33 are closely aligned with each other, interposing the membrane-electrode assembly 31 therebetween to form a fuel passage and an air passage, respectively, at opposite sides of the membrane-electrode assembly 31. In this case, the fuel passage is disposed at the anode electrode of the membrane-electrode assembly 31 and the air passage is disposed at the cathode electrode of the membrane-electrode assembly 31. The electrolyte membrane is configured to move protons generated from the anode electrode to the cathode electrode, thereby enabling ion exchange for generating water by combining protons with oxygen of the cathode electrode. Thus, hydrogen is decomposed into electrons and protons (hydrogen ions) by the oxidation reaction at the anode electrode. Protons move to the cathode electrode through the electrolyte membrane. Electrons do not move through the electrolyte membrane, but instead move to the cathode electrode of the adjacent membrane-electrode assembly 31 through the separator 33. In this case, flow of electrons generates electrical current. In addition, moisture is generated through the reduction reaction of protons and electrons with oxygen in the cathode electrode.

In the fuel cell system 100, the fuel cell stack 30 includes a continuous plurality of electric generators 35. In this configuration, end plates 37 and 38 are installed at the outermost side of the fuel cell stack 30 to integrally fix the fuel cell stack 30. One end plate 38 is electrically connected to a load 53. In addition, one end plate 38 is in fluid communication with the water tank 51, which is configured to supply water to the reformer 40. The water tank 51 is also configured to withdraw water generated in the fuel cell stack 30. The water tank 51 is installed in fluid communication with a water transferring pipe 52, which is configured to supply water to the reformer 40. The water transferring pipe 52 is installed in fluid communication with a water transferring pump 60.

Figure 2:
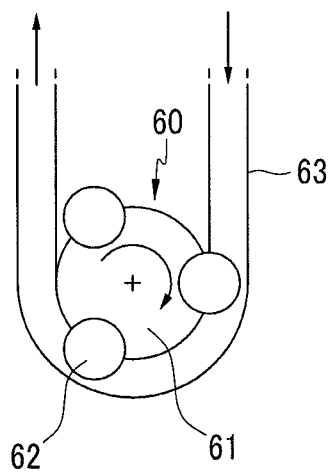
FIG. 2 is a configuration diagram showing a driving state at supplying water by a peristaltic pump.

As shown in FIG. 2, a water transferring pump 60 may include a peristaltic pump. The water transferring pump 60 includes a pump pipe 63 that has elasticity, a rotating body 61 adjacently installed to the pump pipe 63, pressing members 62 that are fixed to the rotating body 61 and configured to press the pump pipe 63, and a motor (not shown) configured to rotate the rotating body 61. The rotating body 61 may be formed in an approximate disk form. The pressing members 62 may be formed in a cylindrical shape. The pressing members 62 may be formed in a spherical shape. The pressing members 62 may be formed and configured to rotate at an edge of the rotating body 61. As in the exemplary embodiment, when the pressing members 62 are rotatably fixed to the rotating body 61, the pump pipe 63 rollingly-contacts the pressing members 62, such that the friction between the pressing members 62 and the pump pipe 63 can be minimized and the pressing members 62 can move while pressing the pump pipe 63.

The pump pipe 63 is in fluid communication with the water transferring pipe 52 and is configured to transfer water to the inside thereof. The rotating body 61 includes three or more pressing members 62. The pressing members 62 are configured to move while pressing the pump pipe as the rotator 61 rotates. Therefore, water positioned between the pressing members 62 moves in the moving direction of the pressing members 62.

Figure 4:
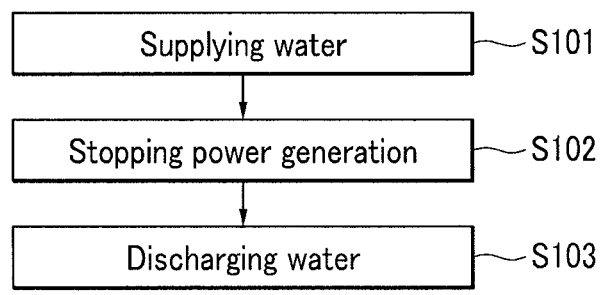
FIG. 4 is a flowchart for explaining a driving method of a fuel cell system according to an exemplary embodiment.

FIG. 4 is a flowchart for explaining a method of driving a fuel cell system according to an exemplary embodiment. The method of driving the fuel cell system 100 includes supplying water (S101), stopping power generation (S102), and discharging water (S103).

Supplying the water (S101) includes supplying water to the reformer 40 by using the water transferring pump 60 installed in fluid communication with the water transferring pipe 52. Supplying the water (S101) includes, supplying fuel to the reformer 40 together with water and the reforming gas reformed in the reformer 40 and supplying the oxidant to the fuel cell stack 30.

As shown in FIG. 2, the rotating body is installed at the water transferring pump 60 and includes the peristaltic pump. The rotating body 61 is configured to rotate during the supplying the water (S101). In this case, the pressing members 62 press the pump pipe 63 to move water from the water tank 51 to the reformer 40. The pressing members 62 are formed in a cylindrical or spherical shape and are rotatably installed to the rotating body 61 to rollingly-contact the pump pipe 63.

The rotating body 61 is configured to rotate in a forward direction (clockwise direction in FIG. 2). Therefore, the pressing members 62 contacting the pump pipe 63 move in a first direction facing the reformer while pressing the pump pipe 63. The pump pipe 63 disposed between the pressing members 62 captures the required quantity of water and supplies it to the reformer 40. As in the exemplary embodiment, when the peristaltic pump 60 is used as the water transferring pump 60, it has pulsation and water head lower than a centrifugal pump, thereby making it possible to supply the required amount of water in a superior manner.

Stopping the power generation (S102) includes blocking the load (blocking the electrical connection between the fuel cell stack 30 and the load 53) and stopping the supply of fuel and oxidant. Stopping the supply of fuel and oxidant may include stopping the supply of fuel and oxidant to either or both of the reformer 40 and the fuel cell stack 30. Stopping the supply of fuel and oxidant may include stopping the supply of fuel, consuming fuel remaining in the reformer and stopping the supply of oxidant. Since the supply of oxidant stops after the fuel in the reformer 40 is consumed, the reformer 40 is prevented from being damaged due to the freezing of fuel remaining in the reformer 40.

Discharging the water (S103) includes rotating the rotating body 61 installed to the water transferring pump 60 such that the pressing members 62 press the pump pipe 63 to move the water in the reformer 40 to the water tank 51. Discharging the water includes pressing the pump pipe 63 using the pressing members 62, storing water between the pressing members 62 and moving the pressing members pressing the pump pipe 63 in a direction of discharging water. At the time of pressing, the pressing members 62 move while contacting the pump pipe 63 by rotating the rotating body 61 to press the pump pipe 63, thereby elastically deform the pump pipe 63.

Figure 3:
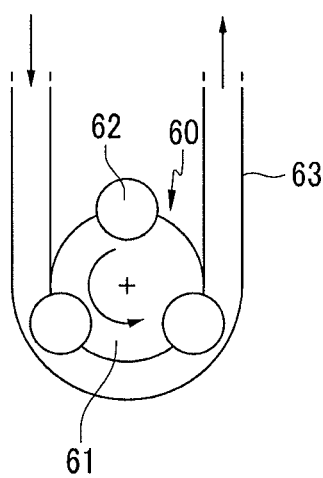
FIG. 3 is a configuration diagram showing a driving state at discharging water by a peristaltic pump.

During the process of storing the water, two pressing members 62 press the pump pipe 63 to store water between the pressing members 62. When the pressing members are moved, the pressing members 62 move in a direction toward the water tank 51 according to the rotation of the rotating body 61. Thus, the water remaining in the reformer 40 moves to the water tank 51. In this case, the rotating body 61 rotates in a reverse direction (counterclockwise direction in FIG. 3) opposite to the forward direction. In other words, the pressing members 62 contacting the pump pipe 63 move in a second direction (direction facing the water tank 51) opposite to the first direction.

The water transferring pump 60 according to the exemplary embodiment moves water at lower pressure than a centrifugal pump since the pressing members 62 move water by pushing, thus making it possible to prevent excessive negative pressure from generating in the reformer 40 at the time of discharging water. In addition, when water is discharged using the water transferring pump 60 including the peristaltic pump, the water discharging pump is not required and water remaining in the reformer can be forcibly moved to the water tank.

While this invention has been described in connection with what is presently considered to be practical exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A method of driving a fuel cell system to discharge water in the reformer, wherein the fuel cell system comprises a reformer configured to supply reforming gas to a fuel cell stack and a water transferring pump comprising pressing members and a pump pipe having elasticity and in fluid communication with a water transferring pipe configured to supply water to the reformer, the method comprising:

supplying water to the reformer by pressing the pump pipe to the pressing members to move the pressing members in a first direction;

stopping power generation comprising stopping a supply of fuel and oxidant to the reformer; and discharging water in the reformer by moving the pressing members in a second direction opposite to the first direction while pressing the pump pipe with the pressing members, wherein the water transferring pump further comprises a rotating body, and a motor configured to rotate the rotating body, wherein the pressing members are installed to an edge of the rotating body, and wherein each of the pressing members is configured to rotate at the edge of the rotating body and to revolve around a periphery of the rotating body while the motor rotates the rotating body, wherein the pump pipe is installed to contact the pressing members and has elasticity to be contracted by the pressing members, wherein supplying water to the reformer comprises moving the pressing members while pressing the pump pipe in a rotatable direction of the rotating body, and wherein the rotating body contacts the pump pipe.

2. The method of claim 1, wherein supplying water to the reformer comprises rotating the rotating body in a forward direction, and wherein discharging water in the reformer comprises rotating the rotating body in a reverse direction opposite to the forward direction.

3. The method of claim 1, wherein supplying water to the reformer comprises providing rolling-contact from the pressing members to the pump pipe.

4. The method of claim 1, wherein stopping power generation comprises:

blocking an electrical connection between the fuel cell stack and a load electrically connected to the fuel cell stack; and stopping a supply of fuel and oxidant to the fuel cell stack.

5. The method of claim 4, wherein stopping the supply of fuel and oxidant to the reformer comprises:

stopping the supply of fuel;
consuming the fuel remaining in the reformer; and
stopping the supply of oxidant.

6. The method of claim 1, wherein discharging water in the reformer comprises:

pressing the pump pipe using the pressing members;
storing water between the pressing members; and
moving the pressing members while pressing the pump pipe.

7. The method of claim 6, wherein moving the pressing members comprises rollingly-contacting the pressing members to the pump pipe.

8. The method of claim 6, wherein moving the pressing members comprises moving the water remaining in the reformer to a water tank in fluid communication with the fuel cell stack, wherein the water tank is configured to store water generated from the fuel cell stack.

9. The method of claim 1, wherein the pressing members are formed in a cylindrical shape.

10. The method of claim 1, wherein the pressing members are formed in a spherical shape.

* * * * *